No. 874,802. PATENTED DEC. 24, 1907.
J. P. SIMMONS.
VEHICLE STEERING GEAR.
APPLICATION FILED MAR. 20, 1907.
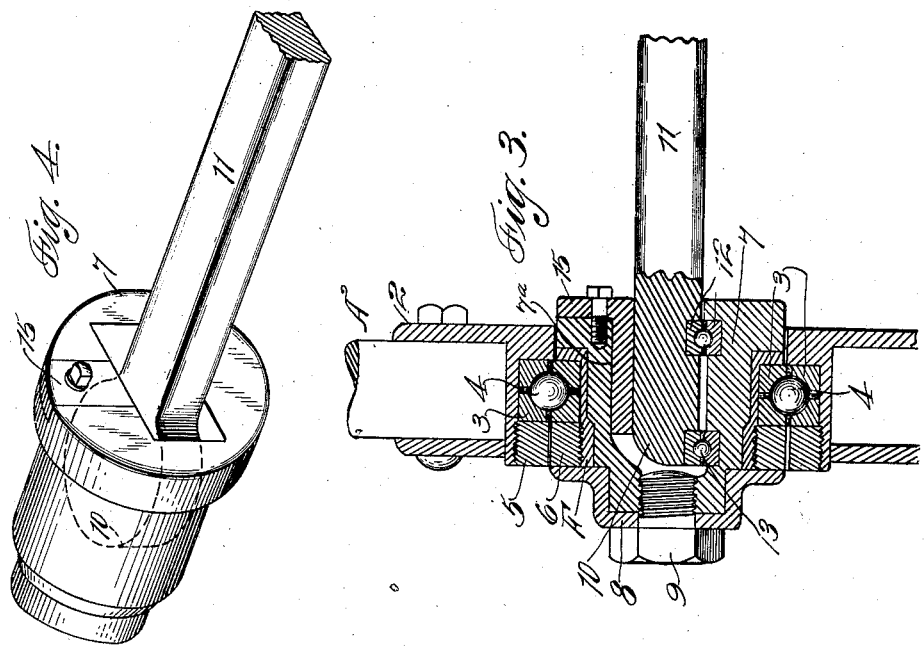
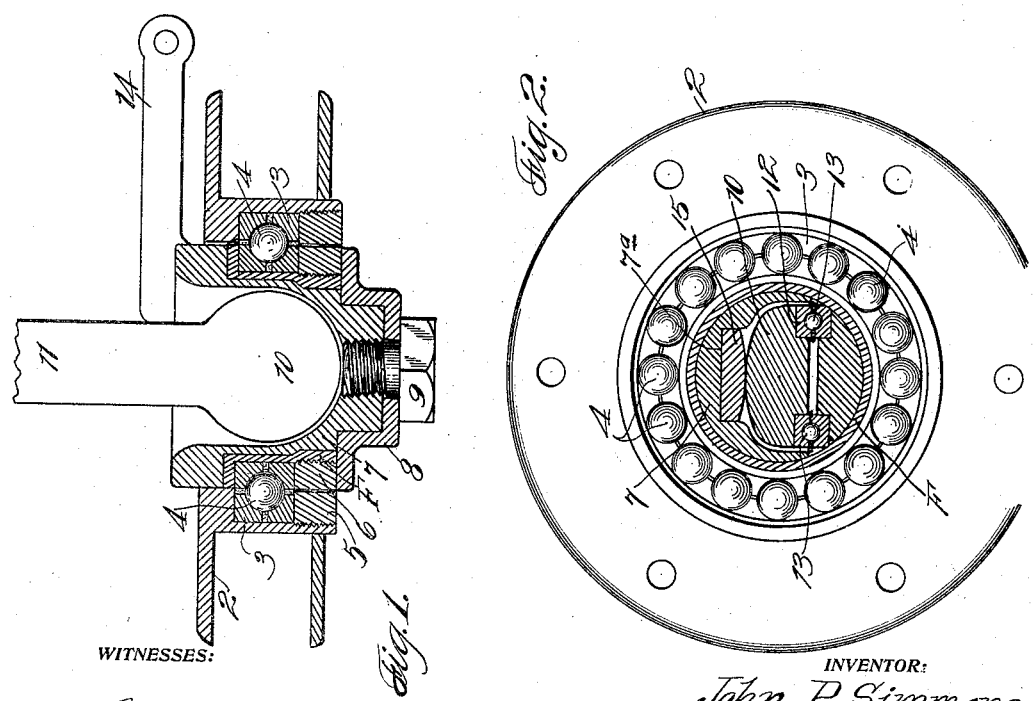
WITNESSES:
INVENTOR:
John P. Simmons,
BY Geo. H. Strong.
ATTORNEY

UNITED STATES PATENT OFFICE.

JOHN P. SIMMONS, OF SAN FRANCISCO, CALIFORNIA.

VEHICLE STEERING-GEAR.

No. 874,802.  Specification of Letters Patent.  Patented Dec. 24, 1907.

Application filed March 20, 1907. Serial No. 363,368.

*To all whom it may concern:*

Be it known that I, JOHN P. SIMMONS, citizen of United States, residing at the city and county of San Francisco and State of California, have invented new and useful Improvements in Vehicle Steering-Gear, of which the following is a specification.

My invention relates to improvements in vehicle wheels and in the manner of mounting and turning such wheels for steering purposes.

It consists in the combination of parts, and in details of construction which will be more fully explained by reference to the accompanying drawings, in which—

Figure 1 is a horizontal section through the hub. Fig. 2 is a vertical section transversely of the axis of the hub. Fig. 3 is a vertical section parallel to the axis. Fig. 4 is a perspective view of the sleeve and axle.

It is the object of my invention to produce a central draft steering mechanism in which the axle ends extend to the center of the steering-wheel, and the load is carried on horizontally disposed ball-bearing turn-tables within the hub of the wheel; the wheel having also an independent ball-bearing in the plane of its rotation.

The wheel A is provided with a hub 2, which may hold spokes, or disk, or other connections with the peripheral wheel rim. Within this hub is located a ball race, which is made in sections as shown at 3, there being an outer and inner annular section within which are assembled the balls 4 which form the bearing around which the wheel is revoluble.

5 and 6 are collars; the collar 5 being screwed into the interior of the hub 2, and the collar 6 being screwed upon a sleeve F located within the interior rings of the ball-race, and fitting loosely upon the part 7. This part 7 is chambered from the inner side as will be hereafter described. The sleeve is secured in place by means of a cap 8 which fits over the outer end of the part 7, and is secured by a screw or nut 9. This part of the construction serves to hold and adjust the ball-bearing 4 which is in the plane of rotation of the wheel, and about which it turns. The adjustments may be readily made at any time by removing the cap 8, and adjusting the ball-race sections by means of the rings 5 and 6. Suitable dust-rings are fitted between these ball-races to prevent the entrance of dust. The opposite side of the part 7 has an open side of sufficient horizontal width to admit the circular end 10 of the axle 11. This axle is rigid, and its two ends are enlarged in a flat circular form, as at 10, and these flat disks have ball-races carried in the lower surface as shown at 12. Within these races, a series of balls 13 are fitted and when the ends of the axles are in place within the wheels it will be seen that the weight rests upon these balls.

The slot or channel made in the part 7 is horizontal and this part has attached to it a lever arm 14 from which connection is made with any suitable or well known steering mechanism; such connection being made with both of the wheels it will be seen that they will be turned about the horizontal ball-bearing tables at the ends of the axle, without changing the position of the axle. In order to retain the members of these horizontally turnable bearings in proper relation with each other, I have shown a chamber made in the upper part of the open channel of the part 7, such chamber being shown at 7ª, and this chamber is adapted to receive a gib or key 15, which thus keeps the weight resting upon this ball-bearing 13, and prevents any separation and jumping apart of the members in passing over rough going. It will be seen at the same time, that the wheel is always turnable in its vertical plane around the ball-bearing 4 whatever may be its change of direction. Thus the steering is perfectly accomplished without any change in position of the axle or part by which the weight of the load is transmitted to the wheel. This horizontal disk bearing being also located in the center of the wheel, all shocks of whatever nature are transmitted directly in the plane of the wheel-rim or periphery, and is not transmitted in the form of shocks to the steering-mechanism.

It will be understood that a plurality of ball-races 5 and 6, and balls therefor, or rollers, may be employed in the wheel hub, as is well known and usual in this class of bearings, without changing the character of my invention.

Having thus described my invention, what I claim and desire to secure by Letters Patent is—

1. A steering mechanism including a fixed wheel axle having horizontal disk-shaped tables at each end, and ball-bearings fitted around the lower side of said disks, a chambered wheel-center within which said horizontal bearing is contained, means entering one side of said chamber and bearing directly upon one side of the disk-shaped table ends of the axle to maintain a bearing contact between the opposite side of the chamber and the contiguous side of the table ends, a vertically disposed ball-bearing, a wheel hub within which it is fitted, said bearing enabling the wheel to turn freely around the horizontally adjustable portion.

2. In a bearing and steering mechanism, a wheel having a hollow hub, a ball-bearing, and sectional race, one portion of which is fitted within the hub, a sleeve upon which the other portion of the race is fitted, rings fitting the hub and sleeve whereby the bearing is adjusted, a hollow central portion, and means securing it within the ball-race carrying ring, a rigid axle having horizontal circular tables at opposite ends, ball-races interposed between said table, and a corresponding bearing surface within the wheel, means by which the wheels may be turned to change their direction with relation to the axle, said wheels being turnable upon the bearing, which is in their plane of rotation.

3. The combination with a wheel having an interior anti-frictional bearing about which it is revoluble, of an axle having a rigid horizontal disk or table at its end, a hollow wheel center within which the table is located, a sleeve inclosing the table, an anti-frictional bearing between the table and the sleeve, and upon which the wheel is turnable about the vertical axis of the table, and means entering one side of the hollow wheel center and bearing directly upon one side of the disk or table ends of the axle to maintain a bearing contact at the opposite side between the table and the contiguous surfaces of the sleeve.

4. The combination with a wheel having an interior anti-frictional bearing about which it is revoluble, of a central horizontally channeled portion, an axle having a flat horizontal circular disk rigid therewith and located within the horizontal channel of the wheel, an anti-frictional bearing between the table and the hub about the vertical axis of which the wheel is turnable, and means entering one side of the horizontal channel of the wall and bearing directly upon one side of the table to maintain a bearing contact between the wheel and the table bearing.

5. In wheels and axles of the character described, a rigid axle with fixed tables at its ends, horizontally channeled wheel centers between which and the tables turnable joints are formed having common axes with the tables, sectional anti-frictional bearings between said centers and the wheels, about which the wheels are revoluble, and sectional collars within the wheel hubs to adjust the bearings.

6. In wheels and axles of the character described, a rigid axle with fixed horizontal tables at the ends, horizontally channeled wheel centers between which and the tables, turnable joints are formed having axes in common with the tables, sectional anti-frictional bearings between said centers and the wheels about which the wheels are revoluble, sectional collars within the wheel hubs to adjust the bearings and arms connected with the wheels by which the wheels may be turned about the axes of the table.

In testimony whereof I have hereunto set my hand in presence of two subscribing witnesses.

JOHN P. SIMMONS.

Witnesses:
 LINCOLN SONNTAG,
 S. H. NOURSE.